US007818872B2

(12) United States Patent
Dailey et al.

(10) Patent No.: US 7,818,872 B2
(45) Date of Patent: Oct. 26, 2010

(54) METHOD FOR REMOVING A HALF TURN OF A COIL FROM A SLOT OF A DYNAMOELECTRIC MACHINE

(75) Inventors: George F Dailey, Pittsburgh, PA (US); Eric S McDonald, N Huntingdon, PA (US); Adam Stein, Greensburg, PA (US); Michael Vindler, Media, PA (US); Jared Orndoff, Murrysville, PA (US); Ryan Fayewicz, Pittsburgh, PA (US); Jason V Jurgen, N Huntingdon, PA (US)

(73) Assignee: Siemens Energy, Inc., Orlando, FL (US)

( * ) Notice: Subject to any disclaimer, the term of this patent is extended or adjusted under 35 U.S.C. 154(b) by 176 days.

(21) Appl. No.: 12/031,846

(22) Filed: Feb. 15, 2008

(65) Prior Publication Data
US 2009/0229119 A1   Sep. 17, 2009

(51) Int. Cl.
*H02K 15/10* (2006.01)

(52) U.S. Cl. ............................. 29/596; 29/605; 29/732; 29/734; 140/92.1

(58) Field of Classification Search ........... 29/596–598, 29/605–609, 732–736; 310/215–221, 259; 140/92.1; 242/363, 475.7; 72/137, 142
See application file for complete search history.

(56) References Cited

U.S. PATENT DOCUMENTS

| | | | | |
|---|---|---|---|---|
| 4,852,246 A * | 8/1989 | Rochester | ..................... | 29/596 |
| 5,048,177 A * | 9/1991 | Keck et al. | ..................... | 29/734 |
| 7,252,118 B2 * | 8/2007 | Reid | ......................... | 140/92.1 |
| 7,353,586 B2 * | 4/2008 | Majernik et al. | .............. | 29/596 |
| 7,513,029 B2 * | 4/2009 | Ortt et al. | ..................... | 29/596 |

* cited by examiner

*Primary Examiner*—Minh Trinh

(57) ABSTRACT

A method and apparatus which quickly clamps onto the copper strand bundle in the slot of a dynamoelectric machine and rips out the coil from the slot one axial position at a time. As the copper bundle is ripped from the slot the tooling moves along the slot from one end to the other.

12 Claims, 4 Drawing Sheets

METHOD FOR REMOVING A HALF TURN OF A COIL FROM A SLOT OF A DYNAMOELECTRIC MACHINE

BACKGROUND OF THE INVENTION

1. Field of the Invention

This invention pertains generally to dynamoelectric machines, and more particularly to a method and apparatus for removing a resin impregnated coil from a core slot of such a machine.

2. Related Art

A process for globally vacuum impregnating entire large electric generated stator cores was developed by the Siemens Corporation in Germany approximately ten years ago. The process involves a large vacuum tank capable of holding the entire wound stator core as well as space for power rollers to rotate the core while it is partially submerged in liquid resin in the vacuum tank. A significant number of large electric generators have been manufactured using this process since it was introduced. One of the advantages of this process is that all the coils and bracing is installed "dry" so the handling of wet and messy epoxies is not required, which saves a considerable amount of time. Secondly, the liquid resin under the driving force of the vacuum penetrates voids between the coils, stator laminations, and bracing components, which improves both heat transfer and mechanical strength. Thirdly, elimination of gaps between the sides of the stator coils and the stator iron should also eliminate any partial discharge which has been found to occur in some conventionally wound machines having higher operating voltages. One disadvantage associated with the global vacuum impregnated process is the large extraction force required to remove a failed stator half coil. The prior art method of removing such a half coil includes drilling and tapping dozens of holes into each stator half coil, installing steel all-thread rods in each drilled and tapped hole along with a hydraulic cylinder for each all-thread rod. All the cylinders are connected to a common manifold so that all cylinders act in unison in order to extract the stator coil from the slot. Special tooling jigs are required to perform the drilling and tapping operation in order to avoid stator iron damage, such as what would happen if the drill were to penetrate too deeply or wander. In addition, copper is also somewhat difficult to machine due to its tendency to plug up the cutting tools. Tapping copper is very difficult, and adequate lubrication on the tap must be used and the chips must be removed from the tap. This is done to avoid gumming up the tap to the point it becomes stuck in the copper, which can result in a broken tap.

Accordingly, a new method is desired for removing globally vacuum impregnated coils from the core slots of a dynamoelectric machine that is less time consuming, simpler to implement and has less potential for stator iron damage.

SUMMARY OF THE INVENTION

This invention provides the tools and equipment which can quickly and easily clamp onto the copper strand bundle of the coil and rip the bundle out of the slot one axial position at a time. As the copper bundle is ripped from the slot, the tooling moves longitudinally along the slot from one end to the other. More particularly, in accordance with the method of this invention the copper bundle of the coil is cut at a first location. The wedges that anchor the coil in the slot are then removed and the cut end of the coil is gripped by an upender tool and upended at least partially out of the slot. The portion of the coil extending out of the slot is then gripped by an extraction tool that pulls an adjacent segment of the coil out of the slot. The extraction tool then moves axially along the slot and grips the segment of the coil that was just extracted from the slot. The process is repeated again along the length of the slot until the coil is completely extracted from the slot.

The method of this invention is performed with the rotor removed from the stator bore. Preferably, the coil is first cut at a location upstream of the slot. The method of this invention employs three unique tools; a cleaver for performing the cutting step in the form of a hydraulic guillotine, a hydraulic upender tool for performing the upender step and a hydraulic extraction tool for performing the extraction steps.

The cleaver is formed from two spaced, parallel, elongated rails that have opposing grooves running down the length of the rails. A blade having a first side that rides in one of the grooves and a second side that rides in the other of the grooves has a forward leading sharpened edge and a rear driving edge. A hydraulic cylinder and piston provide the driving force for the blade with the rear driving edge of the blade attached to a peripheral end of the piston rod when the cylinder is fixably coupled to a first end of the rails. A reaction plate is removeably secured to a second end of the rails. In regard to the foregoing cleaver the method of this invention further includes the steps of placing the second end of the elongated rails over the coil at the end-turn of the coil approximate where the coil emerges from the slot so that the coil is between the rails and above an elevation where the reaction plate is secured. The reaction plate is then removably secured to the elongated rails on either side of the rails adjacent to the grooves, so that it spans the distance between the rails. The piston is then extended to lower the blade to the reaction plate to cut through the coil. Desirably, the travel length of the piston stops the blade just above the reaction plate.

Additionally, the method of this invention employs an upending tool that comprises a five bar linkage wherein one of the bars is anchored at one end in the coil slot, which is the fifth bar, and is coupled at the other end to the peripheral end of the piston rod of a hydraulic cylinder. The other two bars are hingedly coupled at one end together and respectively coupled at the other end to the peripheral end of the piston rod and the cylinder. The coupling of the latter two bars is connected to a nylon strap which is wound around the cut end of the coil to clamp the coil. When the piston rod is extended it forces the coil to be raised within the slot. The three bars attached to the hydraulic cylinder (excluding the piston rod) are each formed from telescoping segments that can be extended and locked in position. After the piston rod is extended and the coil is moved upward in the slot the piston rod retracts and the three bars are retracted to pick up the slack in the strap, which is wound around the end of the coil and the bars are locked at their new lengths. The process is repeated until the end of the coil is upended out of the slot.

The method of this invention then uses an extraction tool to grip the upended end of the coil, preferably gripping substantially each individual strand of the coil. The extraction tool preferably includes a support fixture having a hydraulic cylinder and piston rod coupled at the cylinder to the support fixture with the piston rod extending vertically upward. A tension plate is mounted to the peripheral end of the piston rod with a ball and socket connection. A clamp for clamping the coil is coupled to the tension plate through clamping fingers that are coupled at one end to either side of the tension plate through ball and socket mountings. The clamping fingers extend from either side of the tension plate to the bottom of the fixture where they support elongated gripping plates extending perpendicular to the fingers. The ball and socket connection coupling the tension plate to the piston rod and the clamping fingers to the tension plate enable the gripping plates to move angularly as the coil is raised from the slot. Preferably, each of the opposing fingers is actuated by a separate hydraulic cylinder which presses the plates toward each other to firmly grip the coil. The method of this invention places the gripping plates over the sides of the coil and actuates the hydraulic cylinders that press the gripping plates towards each other and firmly grip the coil strands; then the piston rod connected to the tension plate is raised to extract the segment of the coil from the slot. The clamping plates are then opened, the piston rod attached to the tension plate is then lowered and the fixture is moved along the slot to then grip the next segment which was just raised from the slot. The process is then repeated until the entire half coil is out of the slot. Preferably the opposing faces of the gripping plates have pyramidically shaped teeth that substantially grip each of the strands of the coil. In the process of step-wise coil extraction the extraction tool exerts such large forces in bending each successive segment radially inward and up and out of the slot that this action creates tremendous interlaminar shear forces. These forces are large enough to essentially separate all or nearly all the individual coil roebelled strands, one from the other, which facilitates removal and recycling of the coil.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
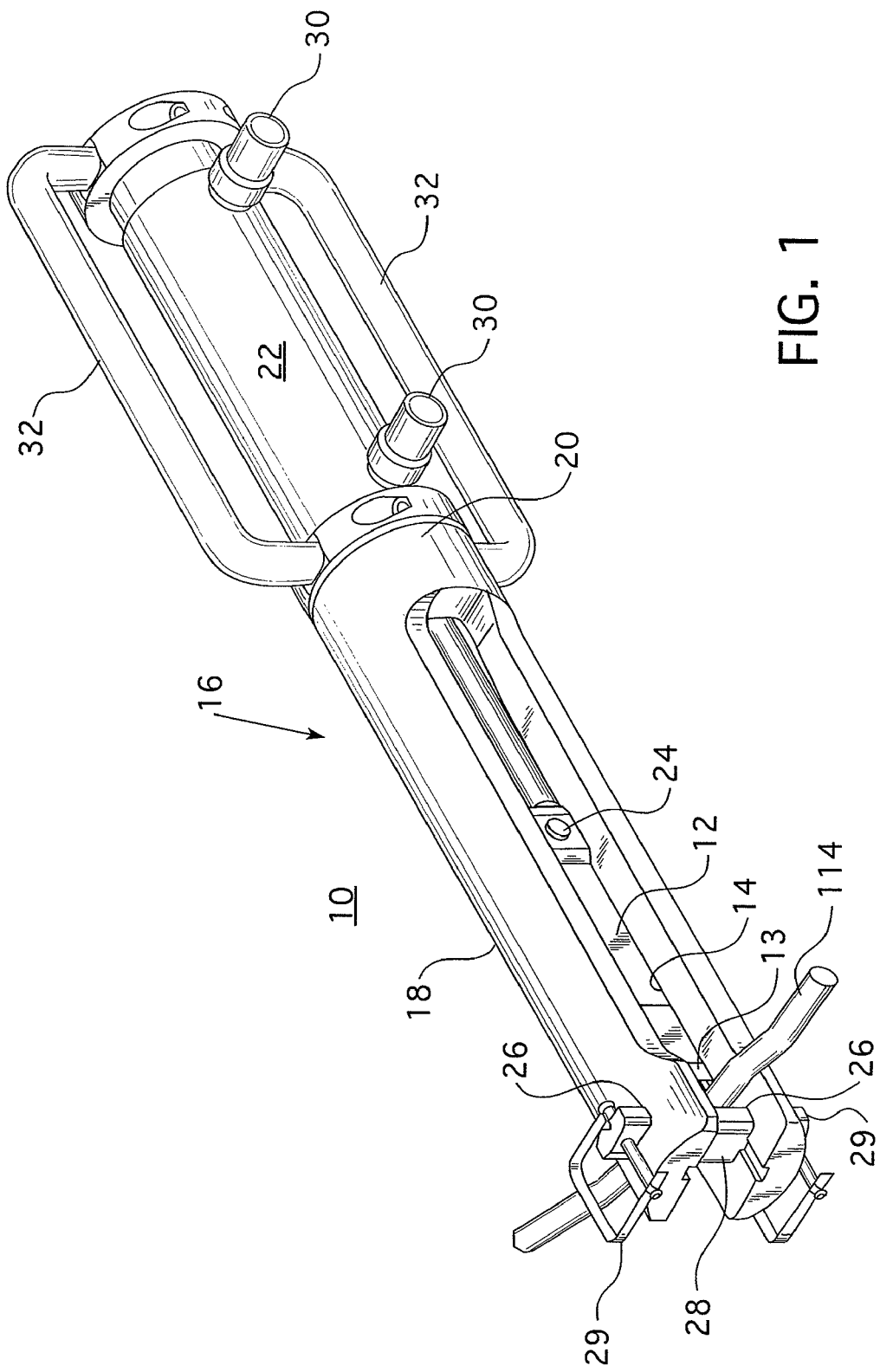
FIG. 1 is a perspective view of the cleaver of this invention.

The improved method of this invention quickly clamps onto the copper strand bundle of a half coil that has been cut in the end-turn region and rips it out of the slot one axial position at a time. As the copper bundle is ripped from the stator slot, the tooling moves along the slot and repeats the process from one end of the slot to the other.

Directional phrases used herein, such as, for example, upper, lower, top, bottom, left, right, and derivatives thereof for the most part relate to the orientation of the elements shown in the drawings and are not meant to be limiting upon the claims, unless expressly recited therein. As employed herein, the statement that two or more parts are "coupled" together shall mean that the parts are joined together, either directly or joined through one or more intermediate parts. In addition, as employed herein the term "number" shall refer to one and more than one, i.e., a plurality.

Figure 2:
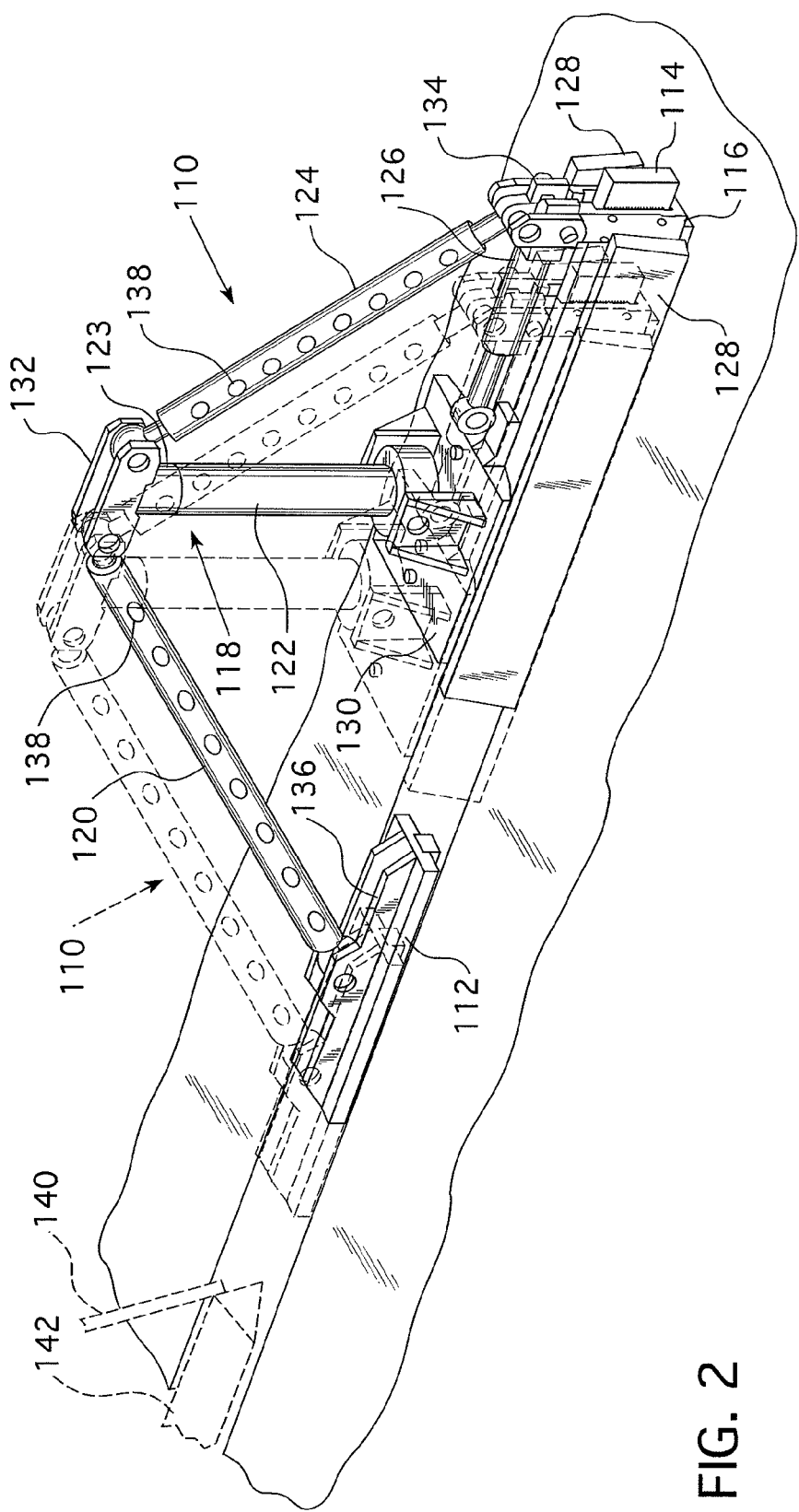
FIG. 2 is a perspective view of the upender apparatus of this invention positioned above a stator slot with the upender apparatus shown gripping the cut end of a coil.
Figure 3:
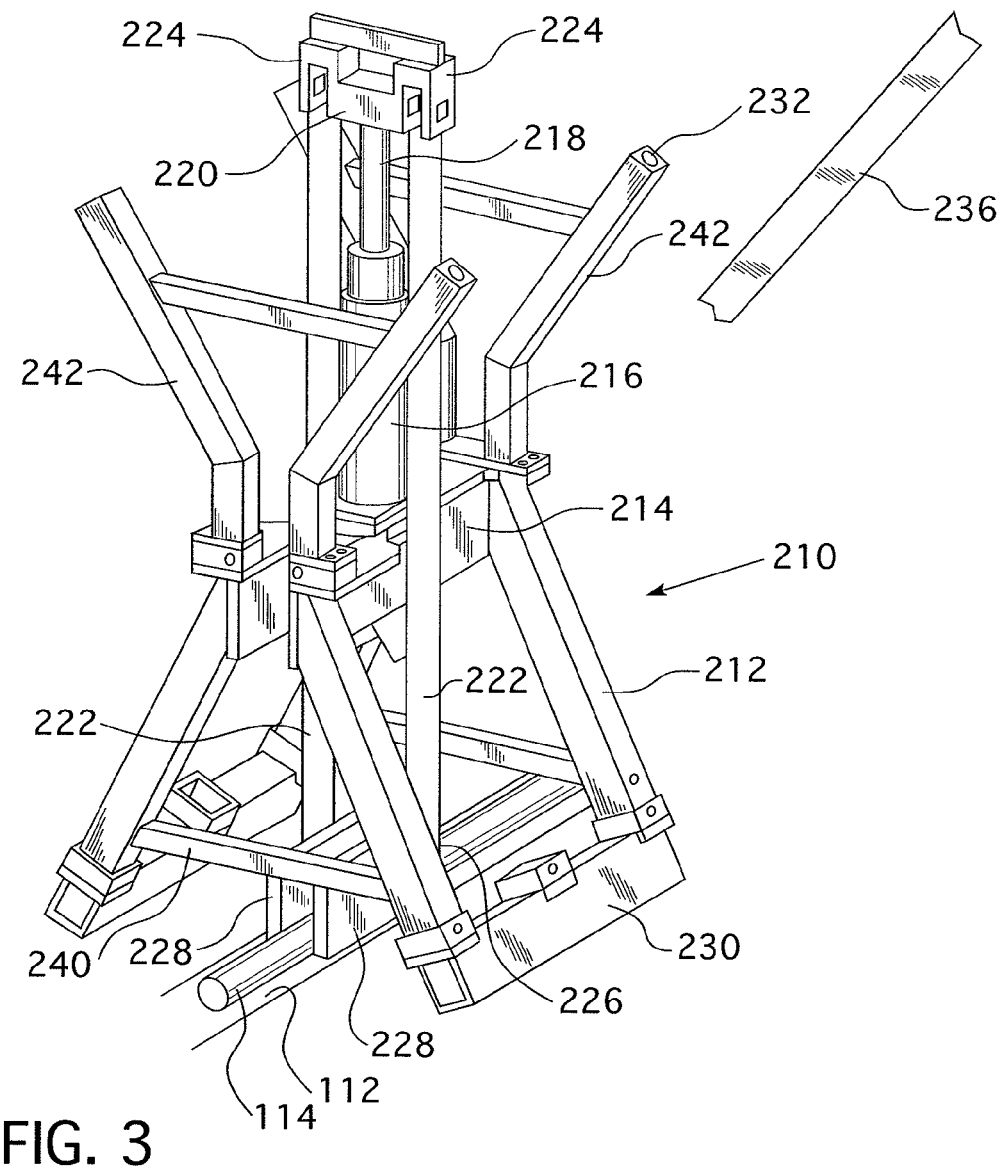
FIG. 3 is a perspective view of the extraction tool of this invention.
Figure 4:
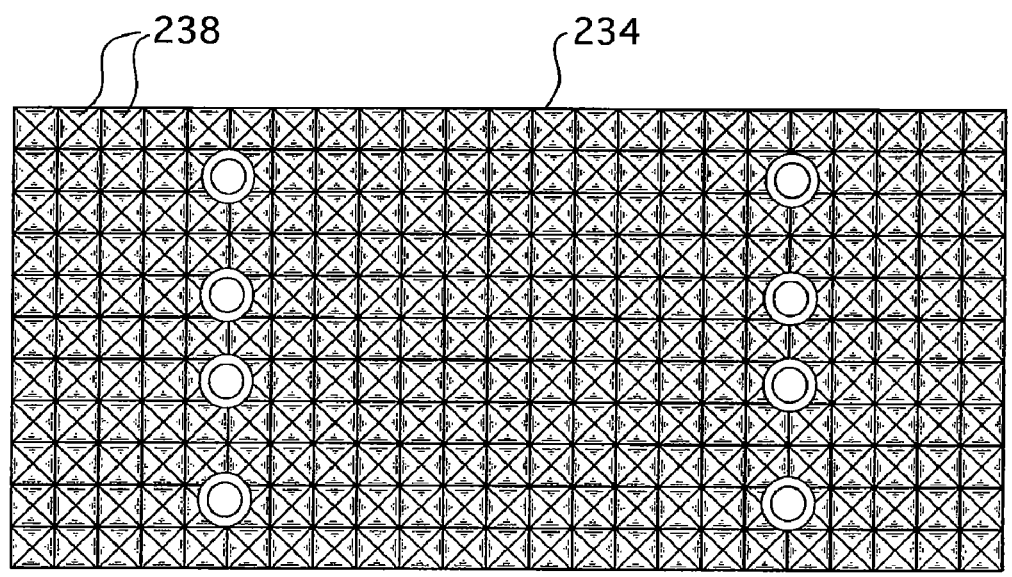
FIG. 4 is a plan view of one of the opposing faces of one of the gripping plates of the extraction tool shown in FIG. 3 illustrating the pyramidically-shaped teeth employed to grip the coil.

The equipment to remove globally impregnated stator half coils employing the method of this invention employs three main tools: the cleaver 10 shown in FIG. 1; the upender 110 shown in FIG. 2; and the extraction tool 210 shown in FIGS. 3 and 4. A saw or extraction bar 140 similar to a crowbar may also be used to remove the wedges 142 commonly employed to retain the coils in the groove, in preparation for the extraction of the coils. The term "coil" is used herein to refer to the copper strand bundle that is wedged into the stator slot.

Cleaver Tool

The cleaver tool 10 is shown in FIG. 1 and is comprised of a hardened steel blade 12 sharpened to a knife edge 13 which rides in two opposing grooves 14 which are machined in the forked end 18 of the round 4140 steel housing 16. A double acting hydraulic cylinder 22 threads into one end 20 of the round housing 16 and a small clevis 24 connects the piston rod of the hydraulic cylinder 22 to the blade 12. The forked end 18 of the housing 16 has two collinear rectangular holes 26 milled into the end of the housing, one on each side. In operation the forked end 18 of the housing 16 is inserted over the copper bundle so that the copper bundle is between the fork tines and is below the blade 13, just above the collinear rectangular holes 26. After the forked end 18 of the housing 16 has been inserted over the coil a high strength steel reaction plate 28 is inserted into the holes 26 so that the reaction plate 28 spans the space between the tines. The reaction plate is then secured in place by safety pins 29 that are inserted on either side of the reaction plate 28. The plate 28 is the reaction point for the blade force. The cleaver 10 has been tested on many different styles of stator coils and the force required is approximately 20,000 pounds (9,071.9 kilograms). Cutting time is about fifteen seconds, which is much faster than the traditional sawzall method and has the advantage that no copper chips are created in the process. Some of the ground wall is turned into small flakes which are easily captured with the vacuum hose. Also, the hydraulic cylinder stroke and the maximum blade travel are preferably sized such that full cylinder stroke is achieved just shy of the point where the blade 12 would contact the reaction bar 28. This prevents the operator from running the blade 12 into the reaction bar 28. The severing of the coil takes place in the end-turn area of the stator where the coil emerges from the slot with the cut end sized so that it can be gripped by the upender tool 110 shown in FIG. 2.

Upender Tool

The wedges that typically lodge the bundle within the slot should be removed prior to upending the end of the coil out of the slot. The wedges can be removed prior to or after the cutting of the end-turn, but should be accomplished prior to the upending step. The wedges may be removed by using brute force with a leverage bar such as a crowbar, or by cutting preferably through the wedge and slightly into the filler strip positioned below the wedge.

After removing the stator wedges in the slot from which the coil is to be removed, the upender tool 110 shown in FIG. 2 is positioned over the slot 112 and grabs the free end of the coil 114 by slipping a nylon webbing sling 116 over the coil 114. The upender tool 110 is a classic "five-bar-linkage" 118. The five bars are designated by reference characters 120, 122, 124, 126 and the stator slot 112. The upender tool 110 has two, spaced, rectangular rails 128 that seat on the surface of the stator teeth on either side of the slot 112. A base 130 is attached to the upper surface of the rails 128 and supports a hydraulic cylinder 122 in the vertical position. The piston rod 123 which extends upward from the upper part of the hydraulic cylinder 122 is fixably attached to a linkage member 132 at its upper end. One end of the linkage member 132 is pivotally coupled to one end of the bar 120 and the other end of the bar 120 is pivotally coupled to a wedge 136 that is adapted to anchor into the slot 112 from which the upender 110 is leveraged to raise the end of the coil 114. The other end of the linkage member 132 is pivotally connected to one end of the bar 124. The other end of the bar 124 is pivotally connected to a second linkage member 134 which itself is pivotally connected to one end of the bar 126. The linkage member 134 also supports the clamp 116. The other end of the bar 126 is pivotally coupled to the base 130. In operation, the sling 116 is slid over the end of the coil 114 and the upender tool 110 is mounted in the slot 112 by wedging the mounting bracket 136 in the slot. The piston 123 of the hydraulic cylinder 122 is then raised a given distance which partially raises the end of the coil 114 out of the slot 112. Three of the five bars 120, 123 and 124 are made from telescoping steel tubing in order that their active length can be changed without having to relocate the mounting bracket 136. The telescoping steel tubing is locked in position at a given length by inserting a locking pin through the aligned holes 138 in the telescoping tubing. This enables the clamp 136 to be anchored in position once per coil upending and not moved until the upending process is complete. As with any five bar linkage 118, each bar 120, 122, 124 and 126 is pinned at its end so that all the bars can pivot and move within the plane of the device. The action of the linkages is such that when the hydraulic cylinder 122 which connects to the linkage member 132 between bars 120 and 124 is extended, link 126, which is connected to the small link 134 acts like a boom crane and simply raises the coil 114 into the "up" position, a rotation of approximately 90 degrees. The maximum force required to upend the coil is applied at the beginning of the process and is approximately 6,000 pounds (2,721.6 kilograms). After the piston has been withdrawn and the telescoping tubing resized, the process is repeated until the end of the coil 114 is completely upended out of the slot. It should be appreciated that the bracket 116 can be replaced by a nylon strap which can be wound several turns around the end of the coil 114. The telescoping tubing would then be resized after each iteration of the upending process to pick up the slack in the strap as the piston rod is lowered.

Extraction Tool

Once the end of the coil 114 is upended from the slot 112 the upender tool 110 is removed from the slot and replaced by the extraction tool 210 shown in FIG. 3. The stator coil extraction tool 210 shown in FIG. 3 comprises an aluminum base support stand or frame 212 in the general shape of a carpenter's saw horse. On a cross bar 214 of the frame 212 is hard mounted a 16 ton double acting Enerpac hydraulic cylinder with a six-inch stroke. A tension plate 220 is mounted via a ball and socket connection to the end of the hydraulic cylinder piston rod 218. Two allthreads are ball and socket mounted at 224 to the tension plate 220. The other end of each allthread rod threads into an end of a rod 222. The rods 222 each attach to a one-inch clevis on the opposing members of a hydraulic clamp 228. The hydraulic clamp is powered by two 20-ton, single acting hydraulic cylinders. The main feature of the hydraulic clamp is the design of its clamping face 234 shown in FIG. 4. The clamping face 234 has pyramidically-shaped teeth 238 which engage the copper coil bundle and increase the effective friction coefficient to a number well above one. It is the effect of these pyramid patterns which are arranged to engage every individual copper strand in the bundle that allows the pull cylinder 216 to develop sufficient force to extract the stator coil from the slot. The typical forces required to extract the stator coil are about 15,000 pounds (6,803.9 kilograms) for a top coil and 18,000 pounds (8,164.7 kilograms) for a bottom coil. As the coil is pulled, the strand bundle shears through the top layer of insulation so that the copper never contacts the stator iron as it is extracted.

Measurement of the motion of a stator tooth top, transverse to the axial direction of the stator coil, shows a movement of 0.005 inches (0.013 cm) of opposing teeth in the tangential direction as the coil is pulled. After the coil is removed the tooth top between coil slots returns to its original position. Therefore, the stator tooth moves in an elastic manner during the stator coil extraction process and is not permanently deformed. As the coil is pulled the ball and socket couplings between the clamp and the extraction hydraulic cylinder enables the coil to first deflect radially upward to an axial outward position.

After the segment of coil is extracted from the slot the extraction tool 212 is moved on its skids 220 along the teeth on either side of the coil slot to repeat the process to extract the next segment of coil from the slot. This process is again repeated until the coil is fully removed from the slot. An alternate design substitutes wheels extending from each leg of the base 212 instead of the nylon skid plates 230. The wheels ride in magnetically affixed steel tracks figuratively shown by reference character 236 in the FIG. 3. The steel tracks 236 are supported by 0.25 inch (0.635 cm) thick continuous leather pads so that the steel tracks never contact the stator iron. One inch thick support leg stabilization cross-members 240 are bolted in position so the entire tool can be positioned over the coil to be removed without having to disassemble the tool. The upper support legs 242 which extend to the opposite side of the interior of the stator from the coil being removed, are each bolted onto the lower structure. Each leg of the upper bracket carries a rubber wheel whose support bracket fits in the opening 232 in each leg of the upper support legs 242. Without the upper support legs it would be almost impossible to extract coils from the top half of the machine.

In the process of step-wise coil extraction the extraction tool exerts such large forces in bending each successive segment radially inward and up and out of the slot that this action creates tremendous interlaminar shear forces that are large enough to essentially separate all or nearly all the individual coil roebelled strands, one from the other, which facilitates removal and recycling of the coil. The main advantage in doing this is that it facilitates manual handling of the stator coil strand remnants. After an amount is extracted it is now a loose bundle of strands that can be manually pushed aside and adjusted for the convenience of the operators. When the bundle itself becomes physically too heavy too manage, a portion can be easily cut off and carried from the bore. The jaws-of-life cutters have been found to work well for this purpose.

Method

The improved method of this invention for removing a half turn of a coil from a slot within a dynamoelectric machine is performed with the rotor removed and comprises the following steps. First, the coil is cut at a location preferably in the end-turn region where the copper bundle emerges from the slot and the wedges that fasten the copper bundle in the slot are removed. It does not make much difference whether the coil is first cut or the wedges are first removed. However, after both the coil is cut and the wedges are removed the cut end of the coil is gripped by an upending tool. The upending tool hydraulically upends at least a portion of a coil up out of the slot. Next, the portion of the coil above the slot is hydraulically gripped with an extraction tool. The extraction tool then pulls a segment of the coil from the slot hydraulically, serially, a segment at a time. Subsequent segments are extracted using the extraction tool by releasing the extracted coil from the extraction tool and moving the extraction tool a distance along the slot toward a portion of the coil still anchored in the slot. The extraction tool then regrips the coil adjacent the portion anchored in the slot and pulls the next segment of coil from the slot hydraulically. This process is repeated until the half turn of coil is removed entirely from the slot. It should be appreciated that though the preferred embodiment employs hydraulic forces to accomplish the various steps, depending upon the size and resin-to-coil application process that was employed, pneumatic cylinders may be substituted for the hydraulic cylinders without departing from the scope of this invention.

While specific embodiments of the invention have been described in detail, it will be appreciated by those skilled in the art that various modifications and alternatives to those details could be developed in light of the overall teachings of the disclosure. Accordingly, the particular embodiments disclosed axe meant to be illustrative only and not limiting as to the scope of the invention, which is to be given the full breadth of the appended claims and any and all equivalence thereof.

What is claimed is:

1. A method of removing a half turn of a coil from a slot of a dynamoelectric machine comprising the steps of:
    cutting the coil with a cutting tool to completely sever the coil at a first location along a length of the coil;
    removing a wedge that anchors the coil in the slot;
    gripping the coil at an end with an upending tool at the first location along the length of the coil where the coil was cut with the cutting tool;
    hydraulically or pneumatically upending the gripped end of the coil at least partially out of the slot;
    hydraulically or pneumatically gripping the upended portion of the coil with an extraction tool;
    pulling a first segment of the coil from the slot hydraulically or pneumatically with the extraction tool, serially a segment at a time by:
    releasing the extracted coil from the extraction tool;
    moving the extraction tool a distance along the slot toward a portion of the coil still anchored in the slot;
    hydraulically or pneumatically re-gripping the coil substantially adjacent the portion of the coil still anchored in the slot; and
    pulling a second segment of the coil from the slot hydraulically or pneumatically with the extraction tool.

2. The method of claim 1 further comprising steps of repeating the steps of:
    releasing the extracted coil from the extraction tool;
    moving the extraction tool a distance along the slot toward a portion of the coil still anchored in the slot;
    hydraulically or pneumatically re-gripping the coil substantially adjacent the portion of the coil still anchored in the slot; and
    pulling a second segment of the coil from the slot hydraulically or pneumatically with the extraction tool, until the half turn of coil is removed from the slot.

3. The method of claim 1 wherein the first location is outside the slot on one side of the dynamoelectric machine including the step of cutting the coil to completely sever the coil, outside of the slot on another side of the dynamoelectric machine.

4. The method of claim 1 wherein the removing step removes all of the wedges in the slot before the coil is upended.

5. The method of claim 1 including the step of removing the rotor prior to the step of removing the wedge.

6. The method of claim 1 wherein the cutting tool is a cleaver in the form of a pneumatic or hydraulic guillotine.

7. The method of claim 6 wherein the guillotine comprises:
    two spaced, parallel, elongated rails that have opposing grooves running down a length of the rails;
    a blade having a first end that rides in one of the grooves and a second end that rides in the other of the grooves and a forward lead sharpened edge and a rear driving edge;
    a hydraulic or pneumatic cylinder and piston with the piston coupled to the rear driving edge of the blade and the cylinder being affixed to a first end of the elongated rails; and
    a reaction plate being removeably secured to a second end of the elongated rails;
    wherein the cutting step includes the steps of:
    placing the second end of the elongated rails over the coil at the first location so that the coil is between the rails and above an elevation where the reaction plate is secured;
    securing the reaction plate to the elongated rails on either side of the rails adjacent the grooves; and
    extending the piston to lower the blade to the reaction plate to cut through the coil.

8. The method of claim 7 wherein the travel length of the piston stops the blade just above the reaction plate.

9. The method of claim 1 wherein the upending tool is a five bar linkage including the step of anchoring one end of two bars in the slot.

10. The method of claim 9 wherein the gripped end of the coil is upended in segments and at least three of the five bars telescope so they can be extended, including the step of extending the three telescoping bars between the upending steps of upending segments of the coil.

11. The method of claim 10 wherein the segments of the coil are upended without removing the one end of the two bars that are anchored in the slot.

12. The method of claim 9 wherein at least one of the bars is a pneumatic or hydraulic piston and cylinder.

* * * * *